United States Patent
Allalouf et al.

(10) Patent No.: US 8,230,238 B2
(45) Date of Patent: Jul. 24, 2012

(54) ESTIMATING POWER CONSUMPTION IN A COMPUTING ENVIRONMENT

(75) Inventors: Miriam Allalouf, Mevaseret-Zion (IL); Michael E. Factor, Haifa (IL); Ronen Itshak Kat, Kfar-Saba (IL); Lee Charles LaFrese, Tucson, AZ (US); Dalit Naor, Tel-Aviv (IL); David Blair Whitworth, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 811 days.

(21) Appl. No.: 12/197,314

(22) Filed: Aug. 25, 2008

(65) Prior Publication Data

US 2010/0050008 A1 Feb. 25, 2010

(51) Int. Cl.
*G06F 1/26* (2006.01)
*G06F 11/30* (2006.01)

(52) U.S. Cl. ........ 713/300; 713/310; 713/320; 713/321; 713/322; 713/323; 713/324; 713/330; 713/340; 703/13; 711/100

(58) Field of Classification Search .................. 713/300, 713/310, 320–324, 330, 340; 711/100; 703/13
See application file for complete search history.

(56) References Cited

U.S. PATENT DOCUMENTS

| | | | |
|---|---|---|---|
| 5,682,273 A | 10/1997 | Hetzler | |
| 5,838,579 A | 11/1998 | Olson et al. | |
| 5,949,689 A | 9/1999 | Olson et al. | |
| 5,954,820 A | 9/1999 | Hetzler | |
| 6,480,815 B1 | 11/2002 | Olson et al. | |
| 7,051,300 B1 * | 5/2006 | Shen et al. | 716/104 |
| 2005/0192787 A1 * | 9/2005 | Kuwahara et al. | 703/18 |
| 2005/0240786 A1 | 10/2005 | Ranganathan | |
| 2006/0103643 A1 | 5/2006 | Mathew et al. | |
| 2006/0248297 A1 * | 11/2006 | Watanabe et al. | 711/162 |
| 2007/0136522 A1 * | 6/2007 | Umemura et al. | 711/113 |
| 2007/0283178 A1 * | 12/2007 | Dodeja et al. | 713/324 |
| 2008/0010521 A1 | 1/2008 | Goodrum et al. | |

OTHER PUBLICATIONS

S. Revoire et al., "JouleSort: A Balanced energy-efficiency benchmark", Sigmod '07, Jun. 11-14, 2007, Beijing, China Source: http://www.hpl.hp.com/personal/Mehul_Shah/papers/sigmod_2007_rivoire.pdf.

D.J. Bradley et al., "Workload-based power management for parallel computer systems", IBM Journal of Research and Development, vol. 47, No. 5/6, 2003 Source: http://www.research.ibm.com/journal/rd/475/bradley.html.

* cited by examiner

*Primary Examiner* — Thuan Du
*Assistant Examiner* — Fahmida Rahman
(74) *Attorney, Agent, or Firm* — F. Jason Far-hadian; Century IP Group

(57) ABSTRACT

A method for determining power consumption in a data storage system is provided. The method comprises determining data access patterns for at least a first storage device in a storage system based on operations performed by the first storage device; and calculating power consumption for the storage system by interpolating costs associated with the operations performed by the first storage device, wherein the cost associated with each operation is determined based on: (1) various levels of activities for the first storage device and a mix of workload characteristics, and (2) predetermined power consumption measurements obtained from one or more benchmarks for same operations performed by a second storage device in a test environment.

20 Claims, 5 Drawing Sheets

ESTIMATING POWER CONSUMPTION IN A COMPUTING ENVIRONMENT

COPYRIGHT & TRADEMARK NOTICES

A portion of the disclosure of this patent document contains material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is for providing an enabling disclosure by way of example and shall not be construed to limit the scope of this invention to material associated with such marks.

TECHNICAL FIELD

The present invention relates generally to estimating the power consumption in a computing environment and, more particularly, to a system and method for approximating power consumed by operations performed in a storage system.

BACKGROUND

In critical storage systems, it is desirable to estimate the amount of electricity consumed by the system or its individual components so that adequate power resources can be provided. Some component manufacturers publish only the highest power consumption estimates for certain system components and do not provide online power metering information. Such estimates, however, are not always accurate and do not particularly distinguish between power consumption during different activity levels (e.g., periods when a component is running in an idle mode or various storage access pattern or levels).

In order to get accurate power usage information for different activity levels for a component, it is possible to connect several digital multimeters to the component (e.g., a disk drive, a flash drive, etc.). The number of multimeters may depend on the various input voltages and the metering technology. A large storage array containing several hundred Terra Bytes of storage space, for example, will need hundreds or thousands of multimeters and a complex collection and processing system to calculate current and voltage information.

Such architecture is somewhat impractical, however, because the addition of a large number of multimeters to a storage system interferes and affects the total power consumption and the physical space within the system. Such implementation may also require substantial measurement processing at the management layer. Further, the decision whether to install the metering equipment depends on the cost of the metering equipment installation versus the benefit that can be achieved by the resulting measurement.

Unfortunately, cost-benefit analysis for deploying the above architecture in most systems is unknown. On the other hand, there is no doubt that more accurate and workload dependant power measurements can help in making a better decision on how to manage power consumption and the availability of power resources that are critical to maintaining a storage system viable at all times.

In addition, hardware equipment by itself cannot sufficiently determine consumed power by a logical volume, particularly in virtualized data center applications that store information by distributing the logical volume data over multiple disks and multiple fragments of disks.

Moreover, offline tools such as capacity planning tools and also online tools that predict storage capacity, performance, and consumed power given configuration and host-level input/output (I/O) pattern must use offline power measurement and estimates in order to predict activity-dependant power estimations.

SUMMARY

For purposes of summarizing, certain aspects, advantages, and novel features of the invention have been described herein. It is to be understood that not all such advantages may be achieved in accordance with any one particular embodiment of the invention. Thus, the invention may be embodied or carried out in a manner that achieves or optimizes one advantage or group of advantages without achieving all advantages as may be taught or suggested herein.

In accordance with one embodiment, a method for determining power consumption in a data storage system is provided. The method comprises determining data access patterns for at least a first storage device in a storage system based on operations performed by the first storage device; and calculating power consumption for the storage system by interpolating costs associated with the operations performed by the first storage device, wherein the cost associated with each operation is determined based on: (1) various levels of activities for the first storage device and a mix of workload characteristics, and (2) predetermined power consumption measurements obtained from one or more benchmarks for same operations performed by a second storage device in a test environment.

The second storage device may be the same as the first storage device. In one embodiment, various levels of activity are associated with I/O rate for the first storage device, and the workload characteristics are associated with levels with which the first storage device is utilized. The power consumption measurements are stored in a data structure so that the power consumption of the storage system can be determined based on interpolation of values stored in the data structure. The data structure comprises values for power consumed by each operation.

In some implementations, various levels of activities for the first storage device and the workload characteristics are determined based on at least one of sequential read I/O rate, sequential write I/O rate, random read I/O rate, random write I/O rate, read and write bytes per transfer, read hit probability, average seek distance per action, stripe and logical track sizes, read/write response time, read/write queue size or a combination thereof.

In accordance with one aspect of the invention, a system comprising one or more logic units is provided. The one or more logic units are configured to perform the functions and operations associated with the above-disclosed methods. In yet another embodiment, a computer program product comprising a computer useable medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The invention is not, however, limited to any particular embodiment disclosed.

BRIEF DESCRIPTION OF THE DRAWINGS

Embodiments of the present invention are understood by referring to the figures in the attached drawings, as provided below.

Features, elements, and aspects of the invention that are referenced by the same numerals in different figures represent the same, equivalent, or similar features, elements, or aspects, in accordance with one or more embodiments.

DETAILED DESCRIPTION OF EXAMPLE EMBODIMENTS

In the following, numerous specific details are set forth to provide a thorough description of various embodiments of the invention. Certain embodiments of the invention may be practiced without these specific details or with some variations in detail. In some instances, certain features are described in less detail so as not to obscure other aspects of the invention. The level of detail associated with each of the elements or features should not be construed to qualify the novelty or importance of one feature over the others.

Figure 1:
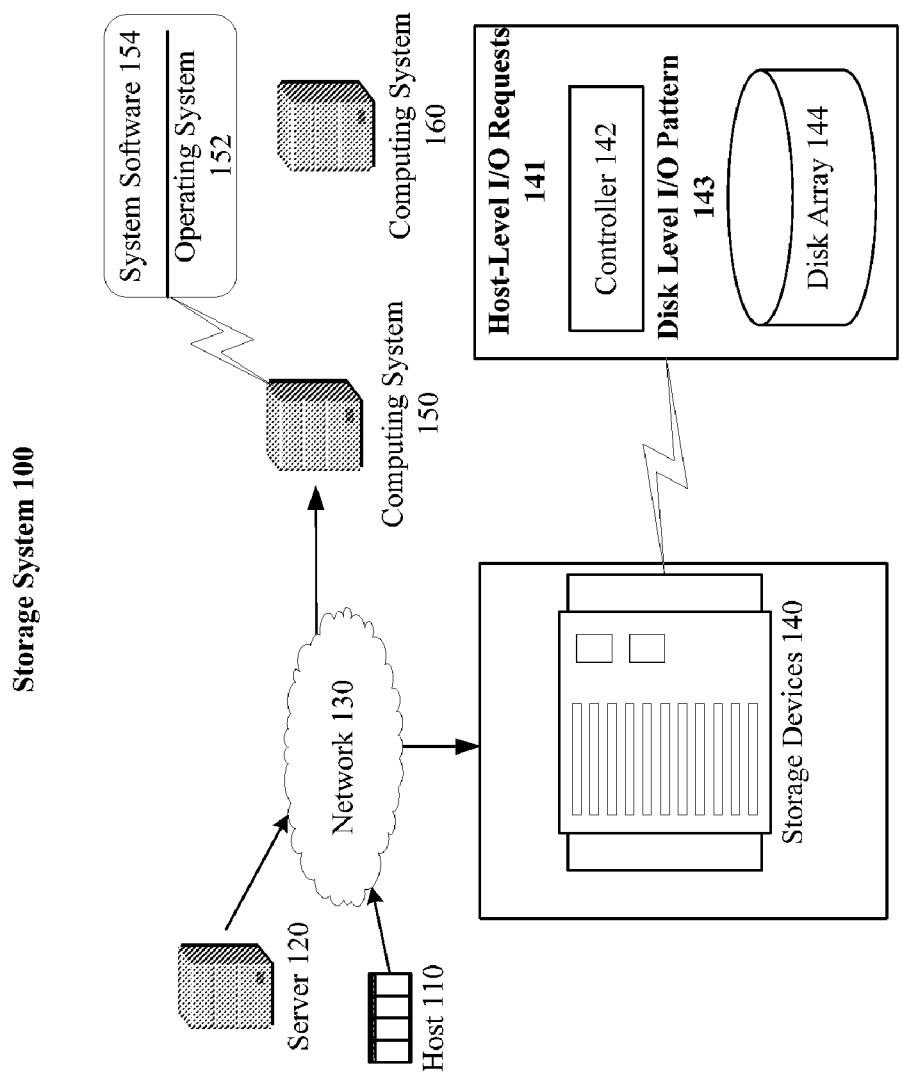
FIG. 1 illustrates an exemplary operating environment in accordance with one or more embodiments.

Referring to FIG. 1, an exemplary storage system 100 is illustrated, wherein applications running on host 110 and server 120 access storage devices 140 over a network 130. The storage devices 140 accept host level I/O requests 141 generated by the applications running on the host 110. The controller 142 internally processes the arriving host-level I/O requests 141 and translates them to the disk-level I/O pattern 143. The storage device 140 may comprise a storage device (e.g., disk drive, solid-state drive (SSD), just bunch of disks (JBOD), magnetic tape, a removable computer diskette, a random access memory (RAM), a read-only memory (ROM), a rigid magnetic disk and an optical disk, etc.) that is attached directly to a server or several disk arrays 144 that are accessed by host applications via the network 130.

Computing systems 150, 160 (e.g., online and offline power estimation computing systems) are configured to estimate the consumed power by the storage devices 140 given the host-level I/O request 141 and storage configuration. The controller 142 of the storage devices reports the host-level I/O request 141, cache access pattern and configuration to computing system 150 or 160 via network 130. Given these parameters, computing system 150 estimates the power consumption for the related operations by simulating the reported storage device configuration, host-level I/O pattern 141 and cache hits as provided in more detail below.

Computing system 150, for example, comprises an operating system 152 over which system software 154 is executed. System software 154 can be configured to calculate power consumption for the storage system 100. In one implementation, system software 154, given host-level I/O requests 141, calculates the disk-Level I/O pattern 143 for the disks in storage devices 140. Storage devices 140 may not provide such internal information due to virtualization. Therefore, the disk access pattern that affects the power consumption is calculated by using workload characterization and drive array configuration in storage devices 140 which comprises multiple hard drives for sharing or replicating data (e.g., a RAID system).

In the following, one or more embodiments are disclosed by way of example as applicable to disk drive characteristics such as seek and transfer operation which consume a specific amount of power. It is noteworthy, however, that in other embodiments same or similar concepts may be utilized and applied to systems that include other types of storage devices such as a SSD, a magnetic tape, a removable computer diskette, a random access memory (RAM), a read-only memory (ROM), a rigid magnetic disk and an optical disk. By way of example, power consumption in storage devices 140 may be related to two categories of activities, namely constant and dynamic.

The constant category is attributed to amount of power that is consumed by a storage medium at an idle state and uses two voltage channels: 12V consumed by the spindle motor, 5V consumed by the disk electronics such as memory, processor, I/O interface, etc. The dynamic category is attributed to power consumed by disk-level I/O operations (i.e., as determined based on disk level I/O pattern 143). For example, one voltage channel (12 V current) is consumed by each disk seek operations, and another channel (5 V current) is consumed by disk magnetic head data transfer operation. Hereafter we refer to a diskOp as a disk activity (e.g., a seek operation or a data transfer operation or any other disk activity involving one or more of read, write, random and sequential) that consume power.

The dynamic portion of the power consumption that is attributed to various disk related activities and operation (e.g., disk level I/O pattern 143) is affected by the workload mix over the disk and each workload's characteristics (e.g., host-level I/O requests 141). Host-level I/O requests 141 (e.g., workload) refers to a stream of I/O operations (e.g., sequential read/write or random read/write) requested by an application.

Depending on implementation, the following operation parameters may be used to determine disk level I/O patterns 143 from host-level I/O requests:

Sequential read I/O rate
Sequential write I/O rate
Non-sequential read I/O rate
Non-sequential write I/O rate
Read and write bytes per transfer
Read hit probability
Average seek distance per action
Stripe and logical track sizes
Read/Write Response Time
Read/Write Queue Size The dynamic power consumption in storage system 100 may be calculated by the exemplary logic code provided below and based on the type of operation being performed. In one embodiment, the host-level I/O requests 141 are translated into disk-level I/O pattern 143 based on the above-noted operation parameters. DiskOps and the number of each diskOp type are counted and then the number of the diskOps is associated with a respective power consumption rate.

Figure 2:
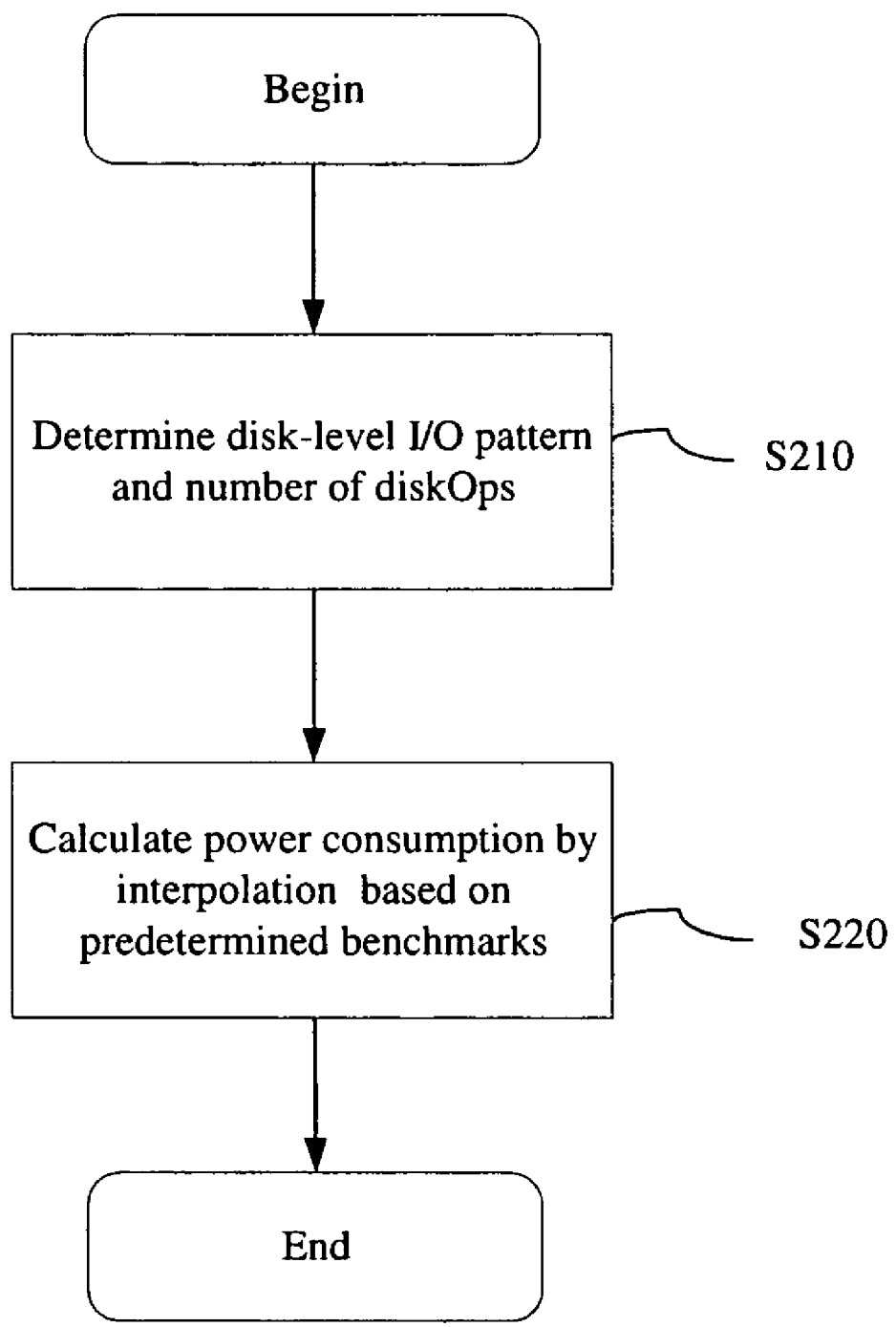
FIG. 2 is a flow diagram of a method for determining power consumption in a data storage system, in accordance with one embodiment.

FIG. 2 illustrates a method for calculating power consumption in a storage system 100 in accordance with one embodiment. System software 154 running on computing systems 150, 160 determines disk-level I/O patterns 143 and counts the number of diskOps for one or more storage devices 140 (S210). System software 154 then calculates power costs for storage system 100 by way of interpolating costs associated with the one or more diskOps based on predetermined benchmarks stored in a data structure, hereafter referred to as a power table by way of example.

Depending on implementation, several types of DiskOps associated with different disk activities and respective voltages may be defined. For example, DiskOpavgSeek refers to the number of seek operations that a disk performs and DiskOpXFR refers to the amount of data transferred to and from storage mediums in storage devices 140. Values of DiskOpavgSeek and DiskOpXFR may be calculated according to the following logic code referred to as calcDiskOps function. It is noteworthy that there is a difference between the power that is consumed by the magnetic head in case of a disk read and a disk write operation.

calcDiskOps(Workload Characteristic)
 1. Compute Read miss, Prestage and Destage according to the performance metrics and workload which are given as input. This computation is based on a set of predefined benchmarks that are performed offline and output power consumption measurements for similar components as those in the storage system 100 (e.g., predetermined power consumption measurements obtained from a test environment).
 2. For each Read miss, Prestage and Destage:

---

In case of Read miss
   If (access type is Random)
      $DiskOp_{avgSeek}$ = 1 + pr(read beyond the current strip for the given XFR)
      $DiskOp_{XFR}$ = f(transfer size, number of transferred blocks)
   If (access type is Sequential)
      $DiskOp_{avgSeek}$ = 0
      $DiskOp_{XFR}$ = transfer size

---

In case of Prestage
   If (access type is Sequential)
      $DiskOp_{avgSeek}$ = 0 + pr(prefetching beyond the current strip)*
      $DiskOp_{XFR}$ = controller prestage transfer size

---

In case of Destage
   If (access type is Random AND
        raid = RAID5 or RAID6)
      $DiskOp_{avgSeek}$ = 2 * (1 + pr(destaging beyond the current strip))
      $DiskOp_{XFR}$ = 2 * (number of mirror copies) * logical track size
   If (access type is Sequential AND
        raid = RAID5 or RAID6)
      $DiskOp_{avgSseek}$ = 0 + pr(destaging beyond the current strip)
      $DiskOp_{XFR}$ = <number of disks in RAID> * strip size
   If (access type is Random AND raid = RAID10)
      $DiskOp_{avgSeek}$ =(number of mirror copies)
      $DiskOp_{XFR}$ = (number of mirror copies)* logical track size
   If (access type is Sequential AND raid = RAID10)
      $DiskOp_{avgSeek}$ = (number of mirror copies)
      $DiskOp_{XFR}$ = (number of mirror copies) * logical track size
Output $DiskOp_{avgSeek}$ and $DiskOp_{XFR}$
* pr(destaging beyond the current strip) = (transfer size + logical track size) div stripe size__

---

In accordance with one embodiment, the input to the calcDiskOps function is the workload characteristics for a host application requesting the I/O operations and the related performance metrics provided by the controller 142 for storage system 100. The output of calcDiskOps function is the number of diskOps associated with the above-noted input. The exemplary logic code implementation of the calcDiskOps function provided above is applicable to storage systems employing RAID architecture (e.g., RAID 5). It is noteworthy, however, that the concepts and schemes utilized herein are applicable to other RAID types or data storage architectures without limitation.

Figure 3:
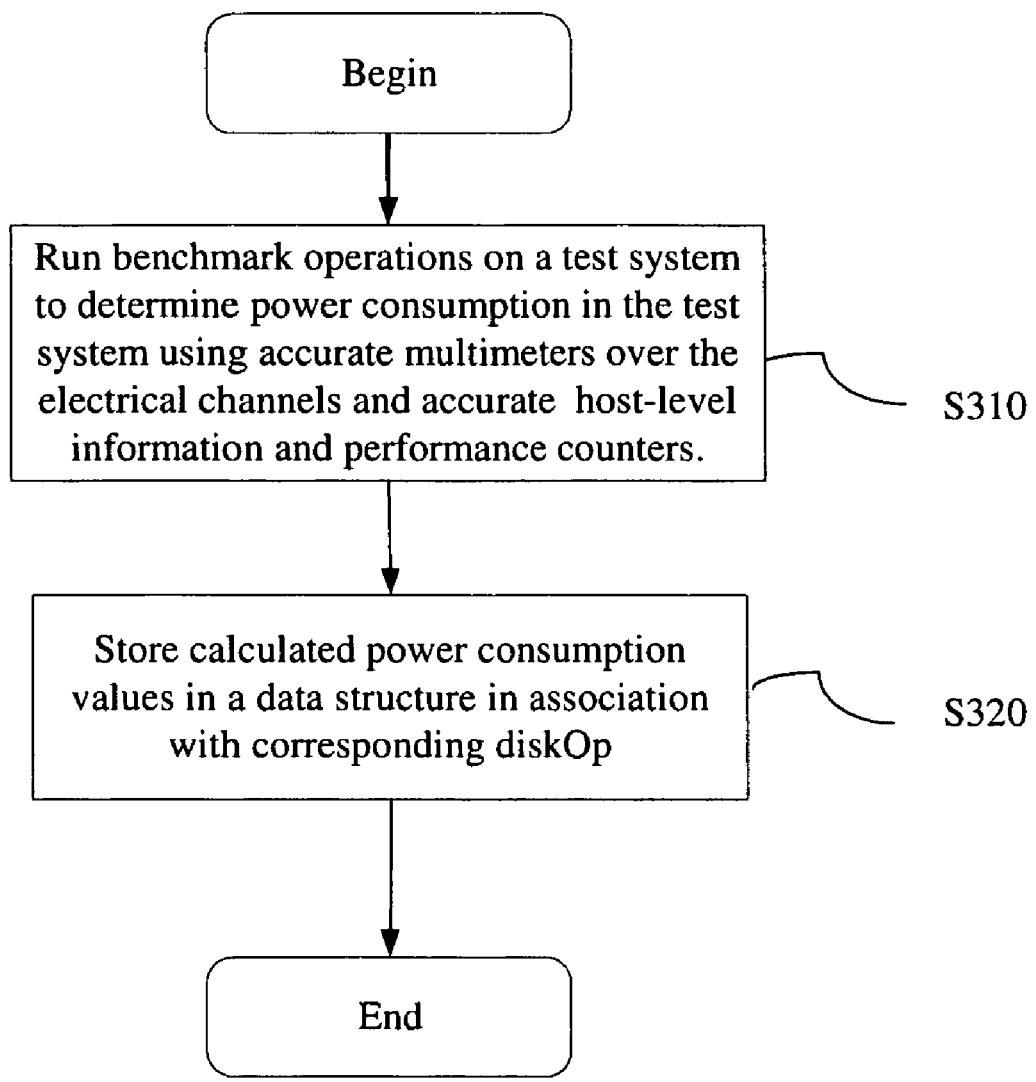
FIG. 3 is a block diagram of an exemplary method for determining the costs associated with a disk operation, in accordance with one embodiment.

Referring to FIG. 3, an empirical approach for determining costs associated with one or more types of diskOps (e.g., a seek operation, a data transfer operation, etc.) is provided. In one embodiment, a set of one dimensional (e.g., corner) benchmarks are run for several utilization levels on a test system to determine power consumption in the test system using accurate multimeters over the electrical channels and based on accurate host level information and performance counters implemented therein (S 310).

In one embodiment, the number of diskOps and the associated measured power consumption samples from the executed benchmarks on the test system are stored in a data structure (e.g., power table) which may be stored in computing systems 150, 160 and used as anchor points for the interpolation process discussed earlier (S320).

Following is an exemplary list of the benchmarks that may be implemented in a test system:
Idle benchmarks for finding the consumed power for a storage array when the disks are on and spinning:
 1. Without I/Os (i.e., background activity is disabled)
 2. With very low random I/O rate (e.g., uniform over all the RAID)
Random read benchmarks:
 1. With various workload utilization levels (e.g., 25%, 50%, 75%, etc.)
 2. With various I/O rates (e.g., 4K, 128K, 500K)
Random write benchmarks:
 1. With an average level of I/O.
 2. With I/O rates (e.g., 4K, 256K, 500K) fine tuned for a rate that is lower than a predetermined saturation point.
Sequential write
Sequential read In certain embodiments, a set of corner benchmarks is defined as the collection of power samples measured by the set of benchmarks used as a base for the total power consumption. A corner benchmark is a benchmark where it is easy to determine the number of its operated diskOps. For example, an estimate for cost associated with X seek operations in a corner workload may include X host-level random read I/Os (where no cache hits occurs) with small transfer sizes.

As another example, the power consumption of a single write may be also calculated. The power consumption of destage seek DiskOps may be estimated by establishing a benchmark that includes a series of write operations under various levels of disk utilization. In one embodiment, the results of the above benchmarks are integrated with the diskOps to compute the power consumption. That is, the power consumption of a storage system 100 may be calculated by matching the detected diskOps with the appropriate level of power consumed as determined by the offline benchmark measurements (e.g., measurements performed on a test system or during a test run on the same system).

For each corner benchmark and the measurement points in the benchmark a data structure (e.g., a power table) may be constructed to store tuples for each type of diskOp in the form of <DiskOp$_i$, power$_i$>, for example, where DiskOp$_i$ represents the number of diskOps as reported (i.e., a performance number) and power$_i$ is the power consumption measured in the benchmark. In one implementation, the smallest amount for a DiskOp is zero.

The power consumption thus may be computed by matching the DiskOps output from the first segment described in the above logic code with the data structure (e.g., power table) that is obtained from the benchmarks provided in the second segment (e.g., S220). The computation, in some embodiments, involves performing a linear or other type of interpolation over the results obtained from the first and second segments. Depending on implementation, the power consumption for seek and data transfer operations may be computed separately.

Accordingly, a storage power consumption model may be implemented by identifying and correlating the power consuming operations to workload characteristics. The above implementation may be also applied and used in both offline tools (e.g., capacity planning tools) and online systems, without using online electrical power measurement equipment physically connected to system components. In one embodiment, multiple levels and granularity of power estimation and reporting may be constructed per storage medium or per a group of storage mediums (e.g., RAID devices) or other storage hierarchy.

In one embodiment, power estimation may be performed per logical volume. That is, the power consumption of the storage components that are used by an application can be measured separately according to the above logic code. In virtualized data center applications that store information by distributing the logical volume data over multiple disks and multiple fragments of disks, the consumed power by a logical volume can be calculated by combining the knowledge of how logical volume fragments are mapped onto the disks together with input parameters that are used as performance counters, workload characterization and disk configuration.

In summary, in order to calculate data consumption in a storage system the following operations are performed: data access patterns for one or more storage devices in a storage system 100 are determined; the cost associated with the one or more operations in the data access pattern are determined; and power consumption in the storage system 100 is calculated by way of interpolating costs associated with the one or more operations. In one embodiment, costs associated with an operation may be determined based on whether the operation is performed while a storage device is in an idle or active mode and according to power consumption measurements (i.e., benchmarks) obtained for performing the same or a similar operation in a test environment (e.g., in an off-line system).

Table 1 below represents an exemplary data structure (e.g., power table) constructed from running five benchmarks on an exemplary test system. The first benchmark measures the 5V and 12V power consumption in a storage device in an idle state (i.e., while no I/O operations are being performed). The other four benchmarks provide data for random read I/Os each with different I/O rates of 480, 960, 1448 and 1976, for example. The data transfer size in this exemplary scenario is assumed to be 4K bytes.

TABLE 1

POWER TABLE

| Benchmark # | 12 V List of Pairs: seeks and power | | 5 V List of Pairs: bytes and power | |
|---|---|---|---|---|
| | Seeks | Amperes over 12 V | Total Transfer Size | Amperes over 5 V |
| 1 | 0 | 6.285 | 0 | 5.675 |
| 2 | 156 | 6.885 | 1966079 | 5.675 |
| 3 | 320 | 8.15 | 3932159 | 5.755 |
| 4 | 483 | 9.2 | 5931007 | 5.87 |
| 5 | 658 | 9.335 | 8093695 | 6.14 |
| 6 | | | 10000000 | 6.765 |

According to one embodiment, as provided earlier, the I/O operations are translated to the total number of seek operations and their associated power consumed (in Amps) and the total number of transferred bytes and the associated power consumed (in Amps). Host level I/O characteristics are translated to disk operations according to the calcDiskops function. Assuming the arriving workload has the I/O rate of 600 I/Os per second, and that it is constructed of several reads and writes, CalcDiskops function may determine that there are 550 seeks and that 10 MB of data were transferred as the result of the detected diskOps, for example.

Referring to Table 1, for 550 seeks, the relative power consumption is derived by interpolating the values recorded for anchor points between 483 and 658 (e.g., 9.22 Amps) in Table 1. The 10 MB reflecting the number of the transferred bytes is higher than the highest value recorded in Table 1, so the highest power consumption for the 5V channel is selected (e.g., 6.765 Amps). The consumed power in Watts is calculated by multiplying the Amps that run over each channel by its voltage as follows: 5*6.765+12*9.22=144.465 Watts).

In different embodiments, the invention can be implemented either entirely in the form of hardware or entirely in the form of software, or a combination of both hardware and software elements. For example, computing systems 110, 120 and system software 114 may comprise a controlled computing system environment that can be presented largely in terms of hardware components and software code executed to perform processes that achieve the results contemplated by the system of the present invention.

Figure 4:
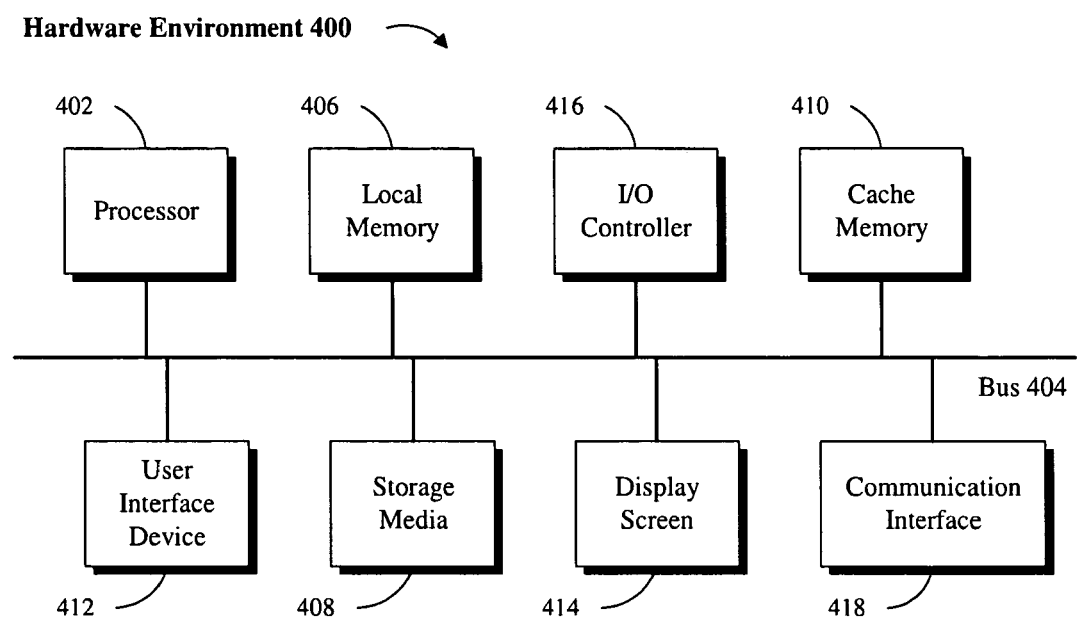
FIGS. 4 and 5 are block diagrams of hardware and software environments in which a system of the present invention may operate, in accordance with one or more embodiments.
Figure 5:
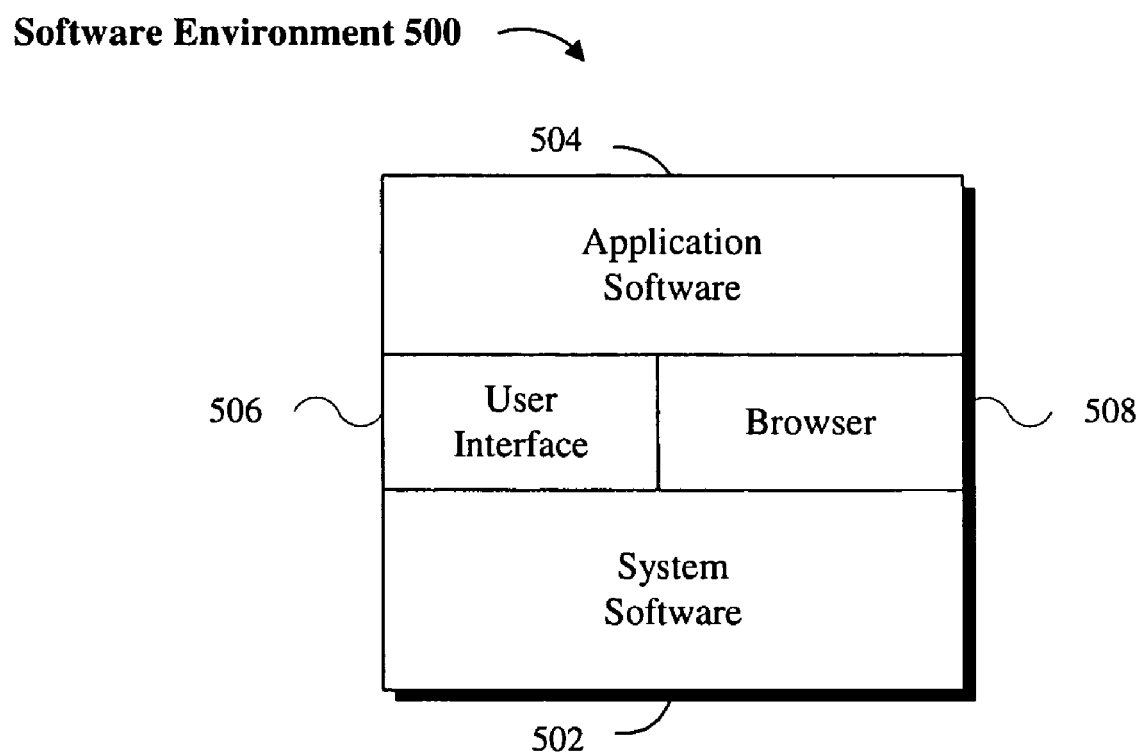

Referring to FIGS. 4 and 5, a computing system environment in accordance with an exemplary embodiment is composed of a hardware environment 400 and a software environment 500. The hardware environment 400 comprises the machinery and equipment that provide an execution environment for the software; and the software provides the execution instructions for the hardware as provided below.

As provided here, the software elements that are executed on the illustrated hardware elements are described in terms of specific logical/functional relationships. It should be noted, however, that the respective methods implemented in software may be also implemented in hardware by way of configured and programmed processors, ASICs (application specific integrated circuits), FPGAs (Field Programmable Gate Arrays) and DSPs (digital signal processors), for example.

Software environment 500 is divided into two major classes comprising system software 502 and application software 504. System software 502 comprises control programs, such as the operating system (OS) and information management systems that instruct the hardware how to function and process information.

In one embodiment, software 154 may be implemented as system software 502 and application software 504 executed on one or more hardware environments to facilitate memory sharing among computing systems in network 130. Application software 504 may comprise but is not limited to program code, data structures, firmware, resident software, microcode or any other form of information or routine that may be read, analyzed or executed by a microcontroller.

In an alternative embodiment, the invention may be implemented as computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate or transport the program for use by or in connection with the instruction execution system, apparatus or device.

The computer-readable medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk read only memory (CD-ROM), compact disk read/write (CD-R/W) and digital videodisk (DVD).

Referring to FIG. 4, an embodiment of the system software 502 and application software 504 can be implemented as computer software in the form of computer readable code executed on a data processing system such as hardware environment 400 that comprises a processor 402 coupled to one or more computer readable media or memory elements by way of a system bus 404. The computer readable media or the memory elements, for example, can comprise local memory 406, storage media 408, and cache memory 410. Processor 402 loads executable code from storage media 408 to local memory 406. Cache memory 410 provides temporary storage to reduce the number of times code is loaded from storage media 408 for execution.

A user interface device 412 (e.g., keyboard, pointing device, etc.) and a display screen 414 can be coupled to the computing system either directly or through an intervening I/O controller 416, for example. A communication interface unit 418, such as a network adapter, may be also coupled to the computing system to enable the data processing system to communicate with other data processing systems or remote printers or storage devices through intervening private or public networks. Wired or wireless modems and Ethernet cards are a few of the exemplary types of network adapters.

In one or more embodiments, hardware environment 400 may not include all the above components, or may comprise other components for additional functionality or utility. For example, hardware environment 400 may be a laptop computer or other portable computing device embodied in an embedded system such as a set-top box, a personal data assistant (PDA), a mobile communication unit (e.g., a wireless phone), or other similar hardware platforms that have information processing and/or data storage and communication capabilities.

In certain embodiments of the system, communication interface 418 communicates with other systems by sending and receiving electrical, electromagnetic or optical signals that carry digital data streams representing various types of information including program code. The communication may be established by way of a remote network (e.g., the Internet), or alternatively by way of transmission over a carrier wave.

Referring to FIG. 5, system software 502 and application software 504 can comprise one or more computer programs that are executed on top of operating system 112 after being loaded from storage media 408 into local memory 406. In a client-server architecture, application software 504 may comprise client software and server software. For example, in one embodiment of the invention, client software is executed on computing systems 110 or 120 and server software is executed on a server system (not shown).

Software environment 500 may also comprise browser software 508 for accessing data available over local or remote computing networks. Further, software environment 500 may comprise a user interface 506 (e.g., a Graphical User Interface (GUI)) for receiving user commands and data. Please note that the hardware and software architectures and environments described above are for purposes of example, and one or more embodiments of the invention may be implemented over any type of system architecture or processing environment.

It should also be understood that the logic code, programs, modules, processes, methods and the order in which the respective steps of each method are performed are purely exemplary. Depending on implementation, the steps may be performed in any order or in parallel, unless indicated otherwise in the present disclosure. Further, the logic code is not related, or limited to any particular programming language, and may comprise of one or more modules that execute on one or more processors in a distributed, non-distributed or multi-processing environment.

Therefore, it should be understood that the invention can be practiced with modification and alteration within the spirit and scope of the appended claims. The description is not intended to be exhaustive or to limit the invention to the precise form disclosed. These and various other adaptations and combinations of the embodiments disclosed are within the scope of the invention and are further defined by the claims and their full scope of equivalents.

What is claimed is:

1. A computer implemented method for determining power consumption in a data storage system, the method comprising:

processing data access requests submitted by way of a host system operating in a computing environment, wherein the data access requests are directed to at least a first storage device operating in a virtualized storage system in said computing environment;

determining disk level data access operations for the first storage device based on processing the data access requests, wherein due to virtualization of the storage system, the first storage device is unable to independently provide information that identify individual disk level data access operations performed by the first storage device, in response to receiving the data access requests submitted by way of the host system; and calculating power consumption for the storage system by interpolating costs associated with each of the operations performed by the first storage device, wherein the cost associated with each of said operations is determined based on:

(1) various levels of activities for the first storage device and a mix of workload characteristics, and (2) predetermined power consumption measurements obtained from one or more benchmarks for same operations performed by a second storage device in a test environment, wherein the second storage device simulates the first storage device in a non-virtualized storage environment such that power consumption measurements for a series of operations performed on the second storage device are accurately obtained by way of test equipment directly connected to the second storage device.

2. The method of claim 1, wherein the second storage device is same as the first storage device.

3. The method of claim 1, wherein various levels of activities are associated with I/O rate for the first storage device.

4. The method of claim 1, wherein the workload characteristics are associated with levels with which the first storage device is utilized.

5. The method of claim 1, wherein the power consumption measurements are stored in a data structure so that the power consumption of the storage system can be determined based on interpolation of values stored in the data structure.

6. The method of claim 5, wherein the data structure comprises values for power consumed by each of the operations.

7. The method of claim 1, further comprising reporting power consumed by a storage device in the storage system.

8. The method of claim 7, wherein the storage system may comprise at least one of a disk drive, a disk RAID, a controller, just a bunch of disks (JBOD), a solid state disk (SSD) or a combination thereof.

9. The method of claim 1, wherein various levels of activities for the first storage device and the workload characteristics are determined based on at least one of sequential read I/O rate, sequential write I/O rate, random read I/O rate, random write I/O rate, read and write bytes per transfer, read hit probability, average seek distance per action, stripe and logical track sizes, read/write response time, read/write queue size or a combination thereof.

10. A system for determining power consumption in a data storage system, the system comprising:
one or more processors for processing data access requests submitted by way of a host system operating in a computing environment, wherein the data access requests are directed to at least a first storage device operating in a virtualized storage system in said computing environment;
a logic unit for determining disk level data access operations for the first storage device based on processing the data access requests, wherein due to virtualization the first storage device is unable to independently provide information that identify individual disk level data access operations performed by the first storage device, in response to receiving the data access requests submitted by way of the host system; and
a logic unit for calculating power consumption for the storage system by interpolating costs associated with each of the operations performed by the first storage device, wherein the cost associated with each of said operations is determined based on:
(1) various levels of activities for the first storage device and a mix of workload characteristics, and
(2) predetermined power consumption measurements obtained from one or more benchmarks for same operations performed by a second storage device in a test environment, wherein the second storage device simulates the first storage device in a non-virtualized storage environment such that power consumption measurements for a series of operations performed on the second storage device are accurately obtained by way of test equipment directly connected to the second storage device.

11. The system of claim 10, wherein the second storage device is same as the first storage device.

12. The system of claim 10, wherein various levels of activities are associated with I/O rate for the first storage device.

13. The system of claim 10, wherein the workload characteristics are associated with levels with which the first storage device is utilized.

14. The system of claim 10, wherein the power consumption measurements are stored in a data structure so that the power consumption of the storage system can be determined based on interpolation of values stored in the data structure.

15. The system of claim 14, wherein the data structure comprises values for power consumed by each of the operations.

16. The system of claim 10, further comprising a logic unit for reporting power consumed by a storage device in the storage system.

17. The system of claim 16, wherein the storage system may comprise at least one of a disk drive, a disk RAID, a controller, just a bunch of disks (JBOD), a solid state disk (SSD) or a combination thereof.

18. The system of claim 10, wherein various levels of activities for the first storage device and the workload characteristics are determined based on at least one of sequential read I/O rate, sequential write I/O rate, random read I/O rate, random write I/O rate, read and write bytes per transfer, read hit probability, average seek distance per action, stripe and logical track sizes, read/write response time, read/write queue size or a combination thereof.

19. A computer program product comprising a non-transient computer useable medium having a computer readable program, wherein the computer readable program when executed on a computer causes the computer to:
process data access requests submitted by way of a host system operating in a computing environment, wherein the data access requests are directed to at least a first storage device operating in a virtualized storage system in said computing environment;
determine disk level data access operations for the first storage device based on processing the data access requests, wherein due to virtualization the first storage device is unable to independently provide information that identify individual disk level data access operations performed by the first storage device, in response to receiving the data access requests submitted by way of the host system; and
calculate power consumption for the storage system by interpolating costs associated with each of the operations performed by the first storage device, wherein the cost associated with each of said operations is determined based on:
(1) various levels of activities for the first storage device and a mix of workload characteristics, and
(2) predetermined power consumption measurements obtained from one or more benchmarks for same operations performed by a second storage device in a test environment, wherein the second storage device simulates the first storage device in a non-virtualized storage environment such that power consumption measurements for a series of operations performed on the second storage device are accurately obtained by way of test equipment directly connected to the second storage device.

20. The computer program product of claim 19, wherein various levels of activities for the first storage device and the workload characteristics are determined based on at least one of sequential read I/O rate, sequential write I/O rate, random read I/O rate, random write I/O rate, read and write bytes per transfer, read hit probability, average seek distance per action, stripe and logical track sizes, read/write response time, read/write queue size or a combination thereof.

* * * * *